United States Patent [19]

Miike et al.

[11] Patent Number: 5,214,583
[45] Date of Patent: May 25, 1993

[54] MACHINE LANGUAGE TRANSLATION SYSTEM WHICH PRODUCES CONSISTENT TRANSLATED WORDS

[75] Inventors: Seiji Miike; Hideki Hirakawa; Etsuo Ito, all of Yokohama; Shin-ya Amano, Ayase, all of Japan

[73] Assignee: Kabushiki Kaisha Toshiba, Kawasaki, Japan

[21] Appl. No.: 440,111

[22] Filed: Nov. 22, 1989

[30] Foreign Application Priority Data

Nov. 22, 1988 [JP] Japan .................. 63-293565

[51] Int. Cl.⁵ .............................. G06F 15/38
[52] U.S. Cl. .................................. 364/419
[58] Field of Search .................. 364/419, 900

[56] References Cited

U.S. PATENT DOCUMENTS

| | | | |
|---|---|---|---|
| 4,774,666 | 7/1988 | Miyao et al. | 364/419 |
| 4,791,587 | 12/1985 | Doi | 364/419 |
| 4,821,230 | 4/1989 | Kumano et al. | 364/419 |

FOREIGN PATENT DOCUMENTS

| | | |
|---|---|---|
| 0189665 | 8/1986 | European Pat. Off. |
| 0201324 | 11/1986 | European Pat. Off. |
| 2199170 | 6/1988 | United Kingdom |

OTHER PUBLICATIONS

Fujitsu Scientific and Technical Journal, vol. 21, No. 3, pp. 317-329, Jul., 1985, H. Uchida, et al., "Atlas: Automatic Translation System".

Primary Examiner—Roy N. Envall, Jr.
Assistant Examiner—Khai Tran
Attorney, Agent, or Firm—Oblon, Spivak, McClelland, Maier & Neustadt

[57] ABSTRACT

A machine translation system including an input unit, a first text memory, a translation dictionary, a translation processor, a second text memory, and a control editor. The first and second text memories respectively store an original text and a translated text. The translation dictionary includes a word/idiom dictionary. The translation processor executes translation processing of the original text using the content of the translation dictionary to obtain the translated text. The control editor controls the respective units, and performs edit processing of at least the translated text. The control editor includes a changing section for changing a translated word in the translated text corresponding to a designated word in the original text to another translated word, and a replacing section for, when the translated word in the translated text corresponding to the designated word in the original text is changed to another translated word by the changing section, providing priority to a translated word in which a translated word portion corresponding to the designated word in the original text is replaced with the other translated word as a translated word corresponding to an entry word including the designated word in the original text in the word/idiom dictionary.

19 Claims, 11 Drawing Sheets

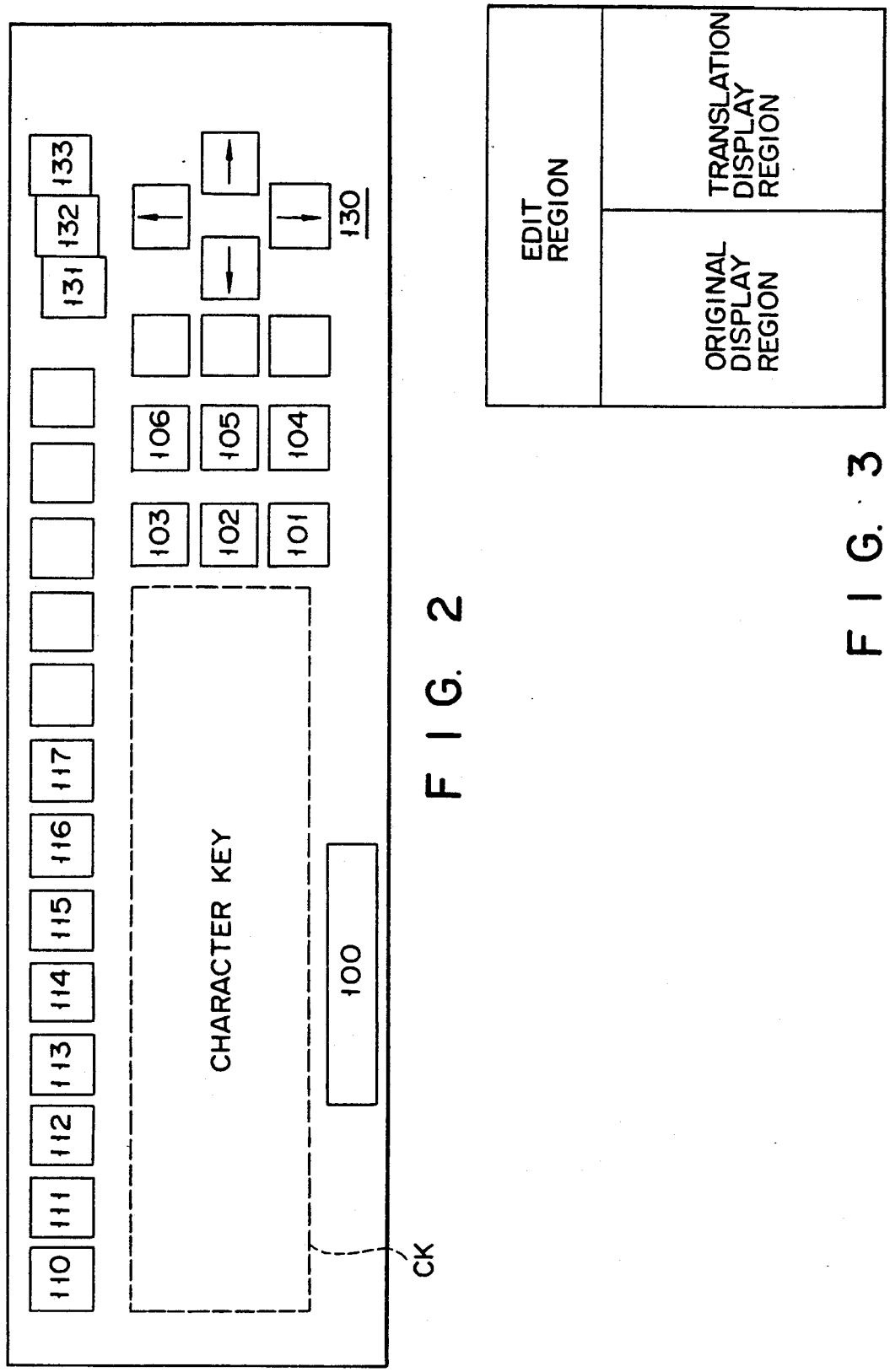

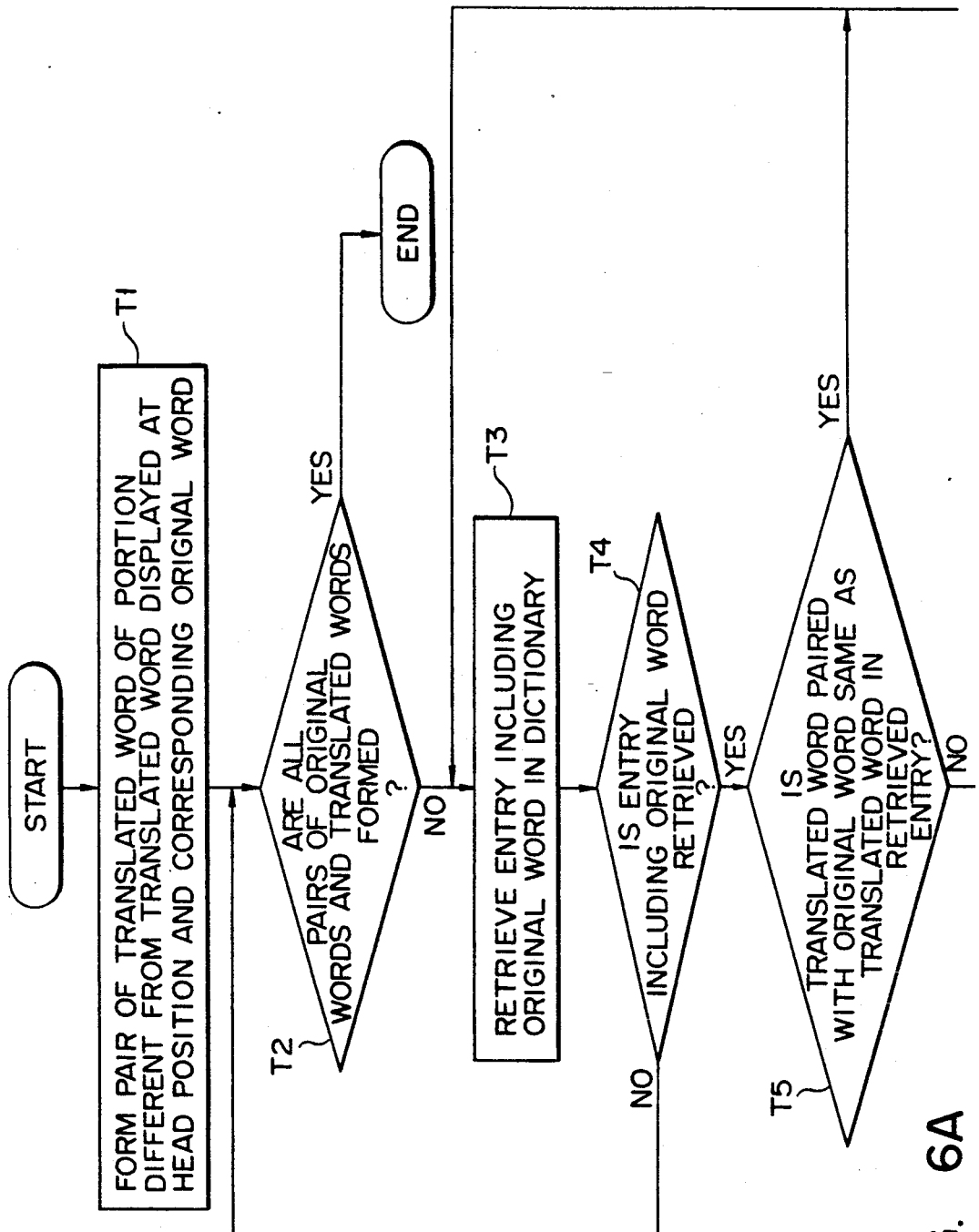
F I G. 6A

| WORD/IDIOM ENTRY OF FIRST LANGUAGE | TRANSLATED WORD ENTRY OF SECOND LANGUAGE |
|---|---|
| DOCUMENT | ドキュメント, 文書 (J21, J22) |
| DOCUMENT FILING SYSTEM | ドキュメント/ファイリング/システム(1,2,3),文書/ファイリング/システム(1,2,3) |
| DOCUMENT PROCESSOR | ドキュメント/プロセッサ(1,2),文書/処理装置(1,2) (J31, J32) |

FIG. 7

| DOCUMENT | ☐ ドキュメント (J11)<br>■ 文書 (J12) |
|---|---|

| WORD/IDIOM ENTRY OF FIRST LANGUAGE | TRANSLATED WORD ENTRY OF SECOND LANGUAGE |
|---|---|
| DOCUMENT | 文書, ドキュメント |
| DOCUMENT FILING SYSTEM | 文書／ファイリングシステム(1,2,3), ドキュメント／ファイリングシステム(1,2) |
| DOCUMENT PROCESSOR | 文書／処理装置(1,2), ドキュメント／プロセッサ(1,2) |

FIG. 10

| WORD/IDIOM ENTRY OF FIRST LANGUAGE | TRANSLATED WORD ENTRY OF SECOND LANGUAGE |
|---|---|
| DOCUMENT | ドキュメント, 文書 |
| DOCUMENT FILING SYSTEM | ドキュメント／ファイリングシステム(1,2,3) |

FIG. 11

| WORD/IDIOM ENTRY OF FIRST LANGUAGE | TRANSLATED WORD ENTRY OF SECOND LANGUAGE |
|---|---|
|  | ⌒J12　　⌒J11 |
| DOCUMENT | 文書, ドキュメント |
|  | ⌒J22　　　　　　　　　　⌒J21 |
| DOCUMENT FILING SYSTEM | 文書/ファイリング/システム(1,2,3), ドキュメント/ファイリング/システム(1,2,3) |
|  |  |

FIG. 12

| WORD/IDIOM ENTRY OF FIRST LANGUAGE | TRANSLATED WORD ENTRY OF SECOND LANGUAGE |
|---|---|
|  | ⌒J41　　　　　　　　　　　　⌒J42　　　　　　　　　⌒J43 |
| DOCUMENT FILING PROCESSOR | 文書/ファイリング/プロセッサ(1,2,3), ドキュメント/ファイリング/プロセッサ(1,2,3), ドキュメント/ファイリング/処理装置(1,2,3) |
|  | ⌒J32　　　　　　　　　⌒J31 |
| DOCUMENT PROCESSOR | 文書/処理装置(1,2), ドキュメント/プロセッサ(1,2) |
|  |  |

FIG. 13

| WORD / IDIOM ENTRY OF FIRST LANGUAGE | TRANSLATED WORD ENTRY OF SECOND LANGUAGE |
|---|---|
| | ～ J41 |
| DOCUMENT FILING PROCESSOR | ×ドキュメント／ファイリング／処理装置(1,2,3), 文書／ファイリング／プロセッサ(1,2,3) ～J42 |
| | ～J43 |
| DOCUMENT PROCESSOR | ドキュメント／プロセッサ(1,2), 文書／処理装置 ～J32 |
| | ～J31 |

FIG. 14

| WORD / IDIOM ENTRY OF FIRST LANGUAGE | TRANSLATED WORD ENTRY OF SECOND LANGUAGE |
|---|---|
| | ～J42 |
| DOCUMENT FILING PROCESSOR | ドキュメント／ファイリング／プロセッサ(1,2,3), ×ドキュメント／ファイリング／処理装置 ～J41 |
| | ～J43 |
| DOCUMENT PROCESSOR | ドキュメント／プロセッサ(1,2), 文書／処理装置(1,2) ～J32 |
| | ～J31 |

| NUMBER | WORD/IDIOM ENTRY OF FIRST LANGUAGE |
|---|---|
| ⌇ | ⌇ |
| 302 | COMPUTER |
| ⌇ | ⌇ |
| 305 | COMPUTER ARCHITECTURE |
| ⌇ | ⌇ |
| 341 | COMPUTER NETWORK |
| ⌇ | ⌇ |
| 913 | DOCUMENT |
| ⌇ | ⌇ |
| 919 | DOCUMENT FILING PROCESSOR |
| ⌇ | ⌇ |
| 938 | DOCUMENT FILING SYSTEM |
| ⌇ | ⌇ |
| 1026 | DOCUMENT PROCESSOR |
| ⌇ | ⌇ |

FIG. 15

| WORD/IDIOM | ENTRY NUMBER INCLUDING WORD/IDIOM IN LEFT COLUMN |
|---|---|
| ⌇ | ⌇ |
| COMPUTER | ----, 302, ----, 305, ----, 341, ---- |
| ⌇ | ⌇ |
| DOCUMENT | ----, 913, ----, 919, ----, 938, ----, 1026, --- |
| ⌇ | ⌇ |
| FILING | ----, 919, ----, 938, ---- |
| ⌇ | ⌇ |
| PROCESSOR | ----, 919, ----, 1026, ---- |
| ⌇ | ⌇ |

FIG. 16

MACHINE LANGUAGE TRANSLATION SYSTEM WHICH PRODUCES CONSISTENT TRANSLATED WORDS

BACKGROUND OF THE INVENTION

1. Field of the Invention

The present invention relates to a machine translation system and, more particularly, to a machine translation system which can obtain a translated sentence in which translated words corresponding to a given original word are consistent.

2. Description of the Related Art

In recent years, a machine translation system as a system for automatically translating an input original text by utilizing a computer has been receiving a great deal of attention. Basically, the machine translation system performs morphological analysis and/or syntactic analysis of an input original text to divide the text into predetermined translation processing units such as words or phrases, and retrieves a translation dictionary for each translation processing unit to obtain a corresponding translated word. The system then links the translated words corresponding to the translation processing units in accordance with a predetermined translation rule to generate translated sentences. In this manner, a translated text corresponding to the original text is obtained.

The major characteristic feature of the machine translation system is that a translated text consisting of translated sentences using the same translated word corresponding to the same word or phrase in an original text can be obtained upon retrieval of a translation dictionary. For example, assume that a Japanese translated text is to be obtained based on an English original text. In this case, if a translated word "konpyuuta (although a Japanese is expressed (written) in kanji characters (Chinese characters) as ideographic characters, hiragana and katakana characters as phonetic characters, or their combinations, a method of expressing pronunciations of Japanese using Roman letters is used herein)" for a word "computer" and a translated word "konpyuuta-nettowaaku" for a word (or phrase) "computer network" are registered in a translation dictionary, translated words "konpyuuta" and "konpyuuta-nettowaaku" are respectively used for the words (phrase) "computer" and "computer network" to generate a translated text. This is one of great advantages of the machine translation system in consideration of the fact that when an original text is manually translated without using the machine translation system, in particular, when one original text is partially translated by a plurality of persons, it is not easy to obtain a translated text in which translated words of the same words (phrases) are consistent.

However, assume that a translated word "keisanki-aakitekucha" is registered for a word (phrase) "computer architecture". In this case, if an original sentence includes a word (phrase) "computer network", although a translated word of the word "computer" in this case must be a translated word "konpyuuta" in "konpyuuta-nettowaaku", the translated word of "computer" in this case must also be a translated word "keisanki" in "keisanki-aakitekucha" if there is a phrase "computer architecture" in an original text. That is, there are different translated words "konpyuuta" and "keisanki" for the same word "computer" in a translated sentence. Therefore, in this case, the advantage of the machine translation system is considerably impaired. In this case, if a translated word "konpyuuta-aakitekucha" is registered for "computer architecture", a given translated word "konpyuuta" can always be obtained for a word "computer". However, even when translated words are registered in the translation dictionary in advance so as to obtain the same translated word for the same original word, if a user changes a translated word of "computer architecture" from "konpyuuta-aakitekucha" to "keisanki-aakitekucha" or registers a new translated word of "keisanki-aakitekucha", the word "computer" then has different translated words "konpyuuta" and "keisanki". In this manner, in an existing system, the advantage of the machine translation system in that a translated sentence with consistent translated words can be obtained is considerably impaired when translated words are changed or new ones are registered.

In this manner, in the existing machine translation system, when translated words are changed or new ones are registered, translated sentences in which translated words are not consistent for the same words (phrases) in an original text are undesirably generated.

SUMMARY OF THE INVENTION

It is an object of the present invention to provide a machine translation system in which when a translated word of a certain original word or phrase is registered or is changed by selecting a different translated word candidate, a portion corresponding to the original word or phrase of an entry word including the word or phrase corresponding to a changed portion of the changed translated word is replaced with the changed translated word, thus obtaining a translated sentence with consistent translated words.

In the machine translation system according to the present invention, when a translated word corresponding to a certain word or phrase in an original text is changed, the changed portion of the translated word and a corresponding original word or phrase are extracted, and entry words including the extracted original word or phrase in a word/idiom dictionary are retrieved. The translated word portions corresponding to the original word or phrase in the retrieved entry words are replaced with the extracted translated word portion.

According to the machine translation system of the present invention, when a translated word of a certain word or phrase is changed by registration or by selecting a different translated word candidate, entry words including the original word or phrase corresponding to the changed portion in the translated word are retrieved in a word/idiom dictionary, and the translated word portions corresponding to the original word or phrase in the retrieved entry words are replaced with the extracted translated word portion. As a result, when a translation is performed using the word/idiom dictionary, a translated text in which translated words corresponding to the same word or phrase are consistent can be obtained. Therefore, an correct translated text which is easy to read can be easily obtained. Since a translated text with consistent translated words can be obtained by only changing a translated word, translation efficiency can be greatly improved as compared to an operation wherein translated words are corrected for consistency while observing a translated text after a translation result is obtained.

BRIEF DESCRIPTION OF THE DRAWINGS

FIG. 2 shows a key matrix of an input unit used in the embodiment, shown in FIG. 1;

FIG. 3 shows a screen layout of a display used in the embodiment shown in FIG. 1;

FIGS. 6A and 6B are flow charts showing a flow of dictionary correction processing in the embodiment shown in FIG. 1;

FIG. 7 and FIGS. 9 to 15 show storage contents of a word/idiom dictionary in the embodiment shown in FIG. 1;

FIG. 8 shows a dictionary display format in the embodiment shown in FIG. 1; and

FIG. 16 shows a table for retrieval control in the embodiment shown in FIG. 1.

DETAILED DESCRIPTION OF THE PREFERRED EMBODIMENT

Figure 1:
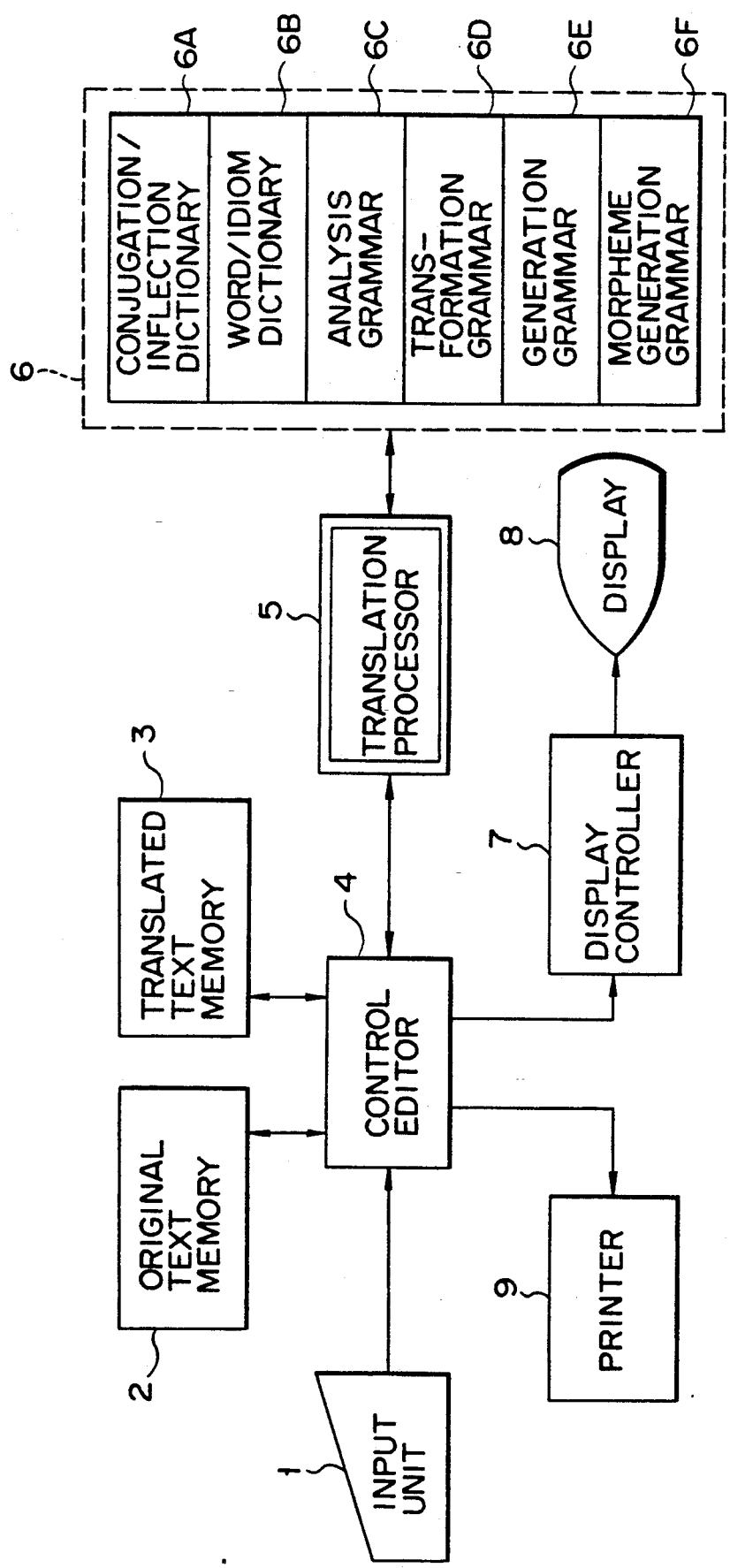
FIG. 1 is a block diagram showing an arrangement of an embodiment of a machine translation system according to the present invention.

FIG. 1 shows the overall arrangement of an English-Japanese machine translation system according to an embodiment of the present invention.

This system comprises an input unit 1 having a keyboard, an original text memory 2 for storing an English text input by, e.g., keys, a translated text memory 3 for storing a Japanese translated text as a translated text corresponding to the input English text, a control editor 4 for controlling the entire system, a translation processor 5 for executing translation processing, a translation dictionary 6 storing knowledge information utilized in the translation processing, a display 8 for displaying original and translated texts, a display controller 7 for controlling the display 8, and a printer 9 for outputting the original and translated texts as hard copies.

FIG. 2 shows a key matrix of the input unit 1. The input unit 1 comprises the following keys in addition to character keys CK for inputting English letters or Japanese characters, that is, a translation instruction key 100, edit keys 101 to 106, function keys 110 to 117, cursor keys 130 to 133, and the like.

FIG. 3 shows a screen layout of the display 8. An input original text is displayed on an original display region on the left side of a screen. A translated text as a result of translation processing is displayed on a translation display region at the right side of the screen at positions corresponding to, e.g., sentences in the original text. An edit region on the upper portion of the screen can be used for displaying information necessary for various edit operations.

Figure 4:
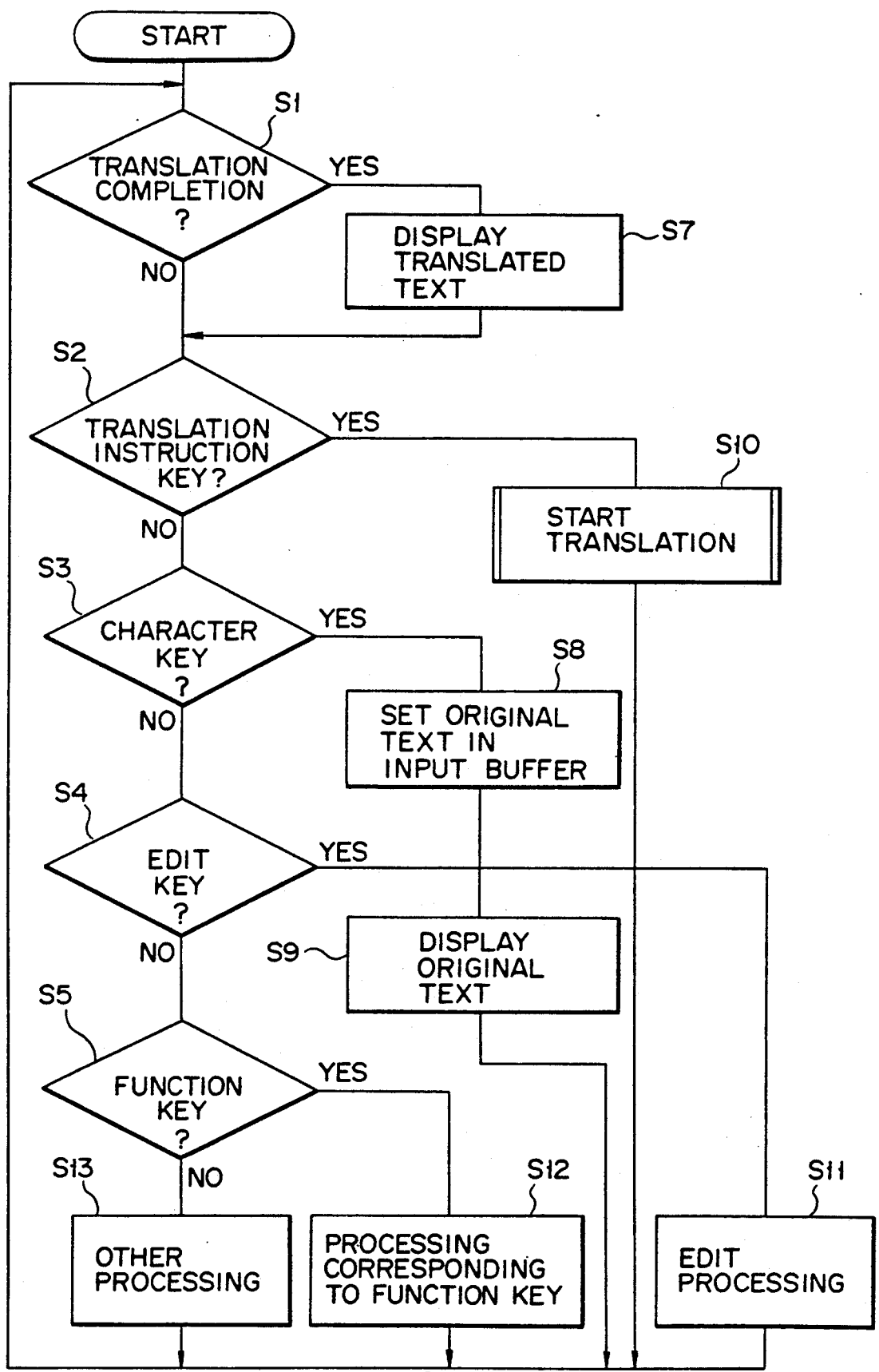
FIG. 4 is a flow chart showing a flow of processing of a control editor used in the embodiment shown in FIG. 1.

FIG. 4 is a flow chart showing a flow of interactive translation processing by the control editor 4. In the interactive translation processing, an operator can input an original text and can edit a corresponding translated text. In steps S1 to S5, the control editor 4 monitors if there is any key input from the input unit 1 or if a translation completion signal is received from the translation processor 5. If YES in one of steps S1 to S5, the control editor 4 performs processing corresponding to the key input.

When the operator operates one of the function keys 110 to 117, the editor 4 detects this in step S5, and performs processing corresponding to the operated function key in step S12.

When the operator operates one of the edit keys 101 to 106, the editor 4 detects this in step S4, and performs processing corresponding to the operated edit key in step S11.

When the operator operates one of the cursor keys 130 to 133 or another control key, processing for moving a cursor corresponding to the operated key or other processing is performed in step S13 throuqh steps S1 to S5.

When the operator inputs an original text by operating character keys, character keys are detected in step S3, and corresponding character codes are then sequentially set in an input buffer (not shown) in the control editor 4 (step S8). The input original text is displayed on the original display region of the display 8 through the display controller 7 (step S9). When the operator depresses the translation instruction key 100 at an arbitrary timing, e.g., when input of one sentence of the original text is completed, this key input is detected in step S2, and the control editor 4 supplies the original text in the input buffer to the translation processor 5 to instruct it to start translation processing (step S10). When an edit operation, e.g., correction, insertion, deletion, or the like is necessary during input of the original text, the cursor is moved to a desired portion to be edited using the cursor keys 130 to 133, and the edit key, e.g., an insertion key 101, a deletion key 102, or the like is operated to execute the edit operation.

Figure 5:
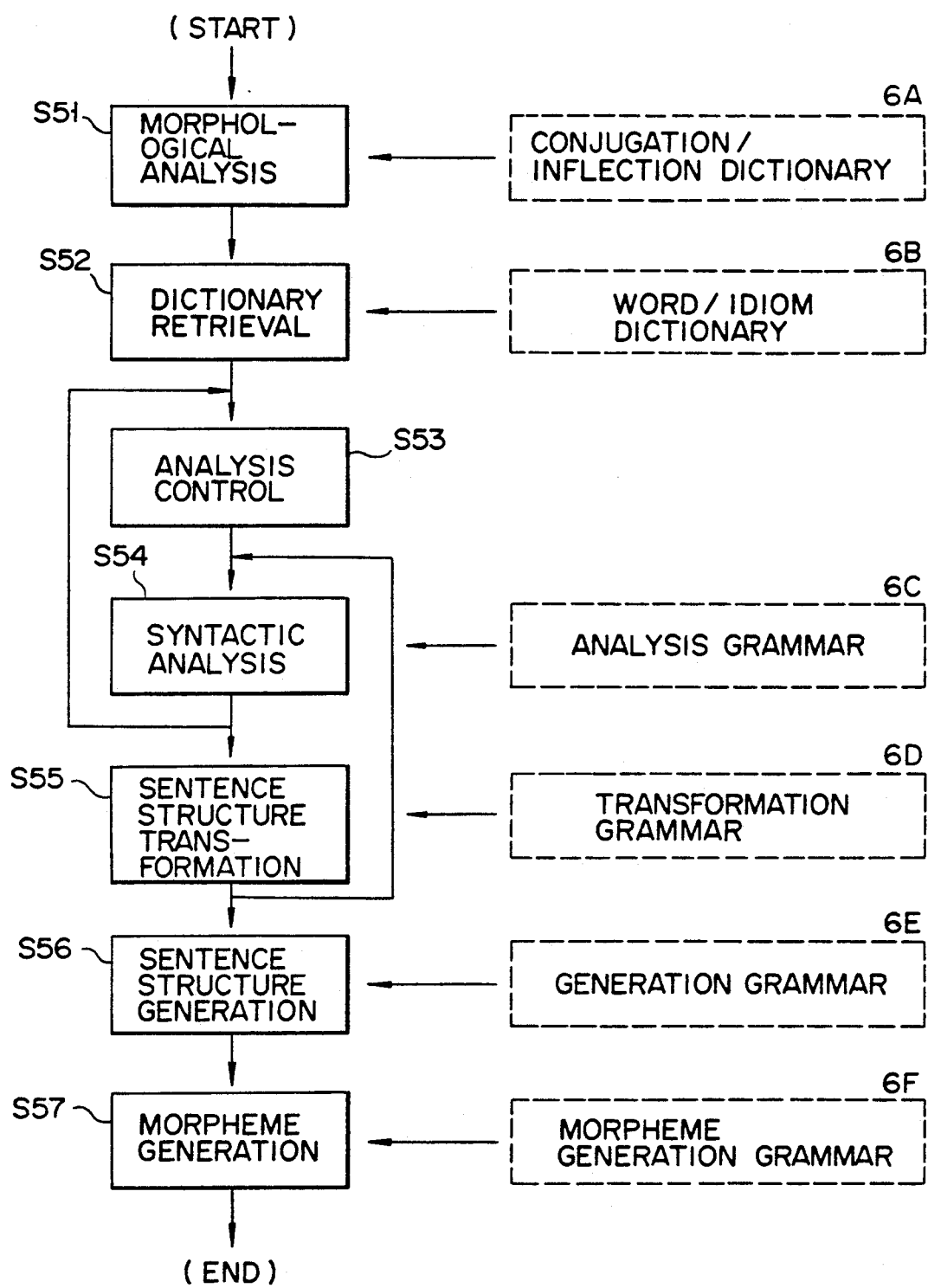
FIG. 5 is a flow chart showing a flow of translation processing in the embodiment shown in FIG. 1.

FIG. 5 shows the flow of translation processing in the translation processor 5.

A morphological analysis section S51 converts words whose endings or the like are inflected in an input original text into their original forms (fundamental forms) using a conjugation/inflection dictionary 6A in the translation dictionary 6.

A dictionary retrieval section S52 obtains part-ofspeech information and translated word information of words and idioms constituting the original text by retrieving a word/idiom dictionary 6B in the translation dictionary 6.

An analysis control section S53 executes processing for sending translation candidates to a sentence structure analysis section.

A syntactic analysis section S54 analyzes a sentence structure of a translation candidate using analysis grammar information 6C in the translation dictionary 6, thus generating an English sentence structure. When analysis is unsuccessful, the control returns to the analysis control section S53.

A structure transformation section S55 transforms an English sentence structure into a Japanese sentence structure using transformation grammar information 6D in the translation dictionary 6. When the transformed structure is discarded, the control returns to the sentence structure analysis section S54.

A sentence structure generation section S56 determines the order of Japanese words based on the Japanese sentence structure in accordance with generation grammar information 6E in the translation dictionary 6 to generate a word string.

A morpheme generation section S57 inflects the words in accordance with morpheme generation grammar information 6F in the translation dictionary 6, thus completing a translated sentence.

The above processing sections output a signal to the control editor 4 when they start processing.

Referring again to FIG. 4, if the control editor 4 detects the translation completion signal in step S1, the flow advances to step S7, and the editor 4 sends translation candidate and auxiliary information obtained from the translation processor 5 to the display controller 7 to cause the display 8 to display the translated text (step S7). The display controller 7 causes the display 8 to display the translation candidate i the translation display region at a position corresponding to the original text (on the left side of the screen). If there is auxiliary information, the corresponding translated word is displayed at high luminance or highlighted, so that the operator can identify it.

When one of the edit keys 101 to 106 is depressed in this state, the control editor 4 detects this in step S4, and performs edit processing corresponding to the depressed edit key for a word or phrase indicated by the cursor (step S11). For example, a character is inserted before the cursor position upon operation of the insertion key 101. Upon operation of the deletion key 102, a character string within a range indicated by the cursor is deleted. Upon operation of a movement key 103, a character string within a range indicated by the cursor is moved. Upon operation of a cancel key 104, the effect of the keys 101, 102, and 103 is invalidated. Upon operation of a modification key 105, a translated word candidate by another modification of a word (phrase) indicated by the cursor is displayed using the auxiliary information.

By using the function keys 110 to 117, the following functions can be realized. Upon operation of a translated word display key 110, a translated word for a word in the translated text is displayed. Upon operation of a dictionary display key 111, the content of the dictionary for a word in the original text is displayed. Upon operation of a dictionary registration key 112, a new word or phrase can be registered. Upon operation of a dictionary deletion key 113, a word or phrase registered by the dictionary registration key can be deleted. Upon operation of a partial translation key 114, a partial translation can be displayed when a translation is unsuccessful.

The cursor keys include cursor move keys 130 for moving a cursor in respective directions, a unit change key 131 for changing a cursor movement unit, an interregion move key 132 for moving a cursor among the display regions, and an enlargement/reduction key 133 for reducing a cursor size to a character unit or enlarging it to a word unit.

Therefore, the operator can interactively obtain a translated text while inputting an original text and performing edit processing of the corresponding translated text.

In the system with the above arrangement, a processing when a user wants to change a translated word corresponding to a word or phrase in an original text, i.e., when another translated word candidate is selected as a translated word or when another translated word is registered will be described below.

Figure 6B:
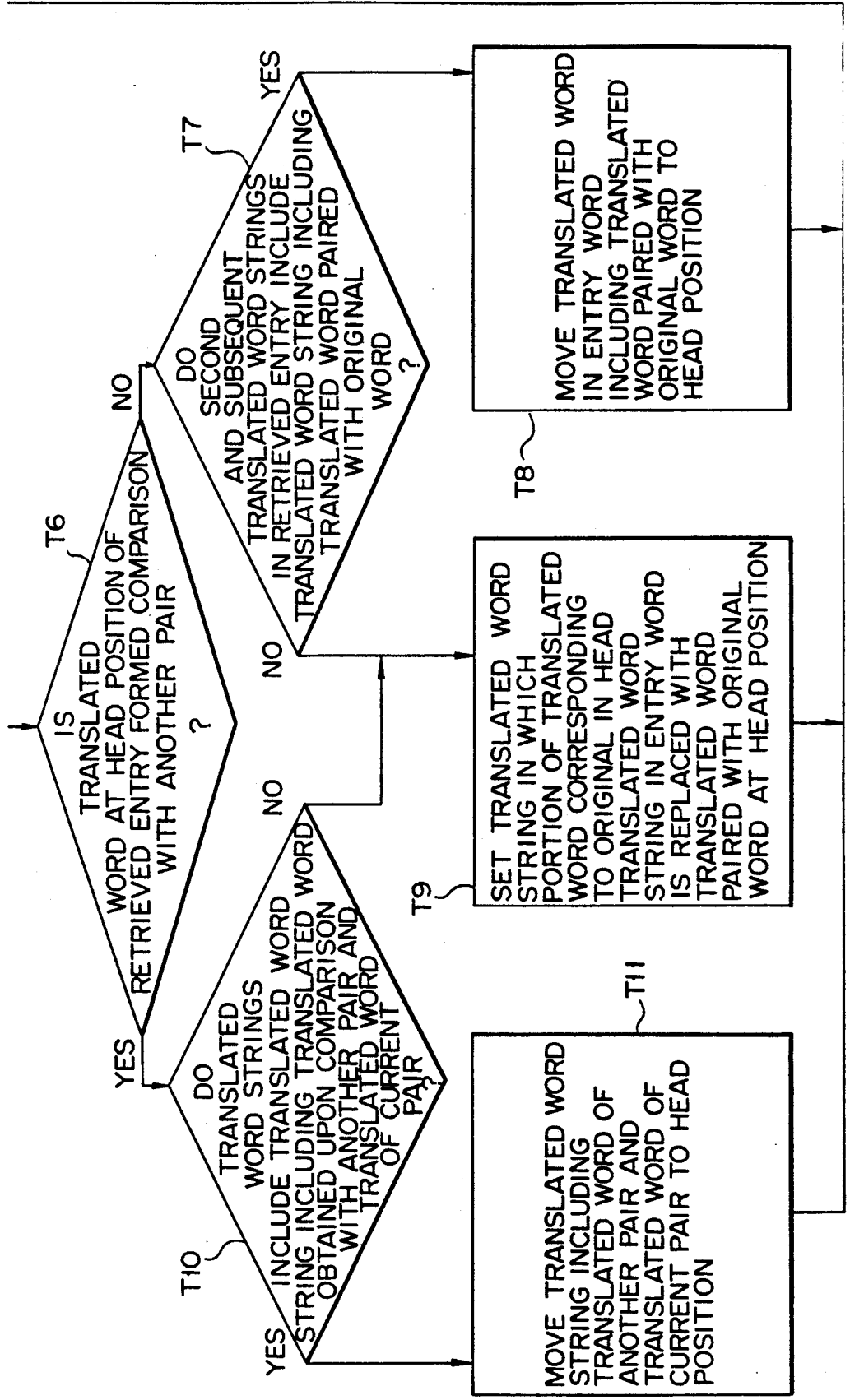

FIGS. 6A and 6B are flow charts showing a flow of the processing. Assume that a translation dictionary shown in FIG. 7 is prepared. In FIG. 7, "/" between translated words in a column of "translated word entry of second language" is a separator. For words or idioms in a column of "word/idiom entry of first language", a space (blank) serves as a separator. A numerical value following a translated word string indicates a correspondence between words/idioms and translated words when they include a separator. Translated word entries of the first language are expressed in Japanese. That is, a translated word J11 is "dokyumento (katakana)"; J12, "bunsho (kanji)"; J21, "dokyumento/fairingu/shisutemu (katakana)"; J22, "bunsho (kanji)/fairlngu/shisutemu (katakana)"; J31, "dokyumento/purosessa (katakana)"; and J32, "bunsho/shori/souchi (kanji)". "(1,2)" after the translated word string J31 "dokyumento/purosessa" means that "dokyumento" is a translated word corresponding to the first word "document", and "purosessa" is a translated word corresponding to the second word "processor". Note that "/" and "(1,2)" are information in the dictionary which do not appear in a translated sentence. FIG. 8 shows a state wherein "document" and its translated words are displayed on the edit region shown in FIG. 3 by the dictionary display key 111. Assume that the user changes the translated word of "document" from J11 "dokyumento" to J12 "bunsho". In this case, in step T1 in FIG. 6A, the original word "document" and the translated word J1 "bunsho" are paired (document : bunsho). In step T2, processing is continued until all the translated words are paired. In step T3, for one pair of the original word and the translated word, entries including this original word ar retrieved in the translation dictionary. In step T4, it is checked if processing is completed for all the entry words including this original word. Thus, processing is continued for all the entry words. In step T5, it is checked if the translated word corresponding to the original word "document" in each retrieved word is the same as the translated word "bunsho" paired with the original word. If YES in step T5, the flow returns to step T3. If NO in step T5, it is checked in step T6 if the head translated word in the retrieved entry is formed upon comparison with another pair. If NO in step T6, it is checked in step T7 if the second and subsequent translated word strings in this entry include the same translated portion corresponding to the original word as the translated word paired with the original word. If YES in step T7, the translated word is moved to the head position. In the translation dictionary shown in FIG. 7, in entries "document filing system" and "document processor" including the original word "document", a translated word corresponding to "document" in each of the second translated word strings J22 and J32 is a translated word "bunsho" paired with "document". Therefore, the second translated word strings J22 and J32 are moved to the head position. FIG. 9 shows the translation dictionary after this processing is executed.

If a translation dictionary including no translated word strings in which a translated word of a portion corresponding to "document" is "bunsho" in the entry "document filing system" of the original word is prepared, the translated word string J22 "bunsho/fairingu/shisutemu" in which a translated word "dokyumento" corresponding to the original word "document" in the head translated words J21 "dokyumento/fairingu/shisutemu" in the entry word is replaced with the translated word "bunsho" in the above pair is generated, and is moved to the head position. FIG. 11 shows the translation dictionary after this processing is performed, in step T9.

Assume that a translation dictionary shown in FIG. 12 is prepared. In this case, as translated word strings of "document filing processor", J41 "bunsho/ fairingu/purosessa", J42 "dokyumento/fairingu/ shorisouchi", and J43 "dokyumento/fairingu/purosessa" are prepared. Assuming that the translated word string of "document processor" is changed from J32 "bunsho/shorisouchi" to J31 "dokyumento/purosessa", two pairs of the original words and translated words, i.e, (document : dokyumento) and (processor : purosessa) are formed in step T1. In this case, for the first pair (document : dokyumento), processing in steps T3 to T9 is repeated. FIG. 13 shows the translation dictionary after this processing is performed. In the entry words "document filing processor", since the second translated word string J42 "dokyumento/fairingu/shorisouchi" in FIG. 12 includes a translated word "dokyumento" corresponding to the original word "document", they are moved to the head position in step T8, as shown in FIG. 13. In this case, a marker "*" indicating that the translated word string is moved by the first pair of the original word and translated word (document : dokyumento) is attached to "dokyumento" in J42 "dokyumento/ fairingu/shorisouchi". When the processing of the next pair of the original word and translated word is performed, it is determined based on the marker "*" in step T6 that the head translated word string of "document filing system" is moved by another pair of the original word and the translated word. It is checked in step T10 if the second and subsequent translated word string include a translated word string in which a translated word corresponding to the original word "document" corresponding to the translated word "dokyumento" with the marker "*" is "dokyumento" and a translated word corresponding to the original word "processor" in the current pair is "purosessa". If YES in step T10, the translated word string is moved to the head position in step T11. FIG. 14 shows the translation dictionary after the processing in step T11 is performed. The marker "*" is attached to the translated word "dokyumento" obtained upon comparison with another pair, so as not to select the translated word string J41 "bunsho/fairingu/purosessa" using the translated word "bunsho" different from this translated word. With this processing, in "document filing processor" and "document processor", a translated word string in which the translated word of "document" is "dokyumento" and the translated word of "processor" is "purosessa" can be set at the head positions in the dictionary. Note that the marker "*" attached to the translated word is deleted when processing is ended in step T2. If it is determined in step T10 that there is no corresponding translated word, a translated word string in which a translated word corresponding to the original word in the current pair in the head translated word string of the entry word is replaced with the translated word paired with the original word is set at the head position, in step T9.

According to the present invention, in the translation dictionary, the same words and idioms have the same translated words, and a translated sentence in which translated words are consistent for the same words and idioms can be obtained.

In the embodiment of the present invention, the English-Japanese machine translation system has been exemplified. However, the present invention may be applied to another pair of languages, e.g., a Japanese-English machine translation system. In the word/idiom entry of the first language, a blank serves as a separator. However, another separator, e.g., "/" may be employed. Alternatively, no separator may be used at all. When no separator is inserted, each of "document processor" and its translated word "dokyumentopurosessa" can be processed as one word. More specifically, a minimum translated word unit is not limited to a word but may be a unit smaller than a phrase or word.

In dictionary retrieval processing, when word/idiom entries of the first language are numbered as shown in FIG. 15 and words and idioms included in two or more entries and the corresponding numbers of the word/idiom entries are paired, as shown in FIG. 16, if a translated word of a word or idiom included in the word/idiom entries shown in FIG. 16 is changed or a new one is registered, retrieval may be performed by utilizing the numbers of the word/idiom entries including it to execute processing. When an entry number is added or deleted to or from the entry numbers in the table shown in FIG. 16, whether to process a corresponding word as an object to be processed can be controlled.

Various other changes and modifications may be made within the spirit and scope of the invention.

For example, replacement need not always be performed for all the corresponding entry words in the dictionary. That is, replacement may be performed for some of the corresponding entry words. In this case, only entry words which satisfy predetermined conditions (e.g., the number of words, parts of speech, and a kind of dictionary when a plurality of dictionaries are used) or arbitrary condition may be objects to be replaced. In addition, a translated word which has been replaced in previous replacement may be displayed so that an operator can identify it so as to prevent replacement.

What is claimed is:

1. A machine translation system comprising:
    input means for inputting at least character information and edit information for an edit operation:
    first text memory means for storing an original text represented in a first language and including a plurality of first language words and at least one first language idiom to be translated into a second language;
    translation dictionary means for storing information for performing a translation, and including word/idiom dictionary means for storing a plurality of first language words and at least one first language idiom which are used as entry words and idiom in correspondence with a plurality of second language words represented in a second language;
    translation processing means for translating the original text stored in said first text memory means into the second language by use of said translation dictionary means to obtain a second language translated text including a plurality of second language words and at least one second language idiom;
    second text memory means for storing the translated text obtained by said translation processing means;
    display means for displaying the original text stored in said first text memory means and the translated text stored in said second text memory means; and
    control edit means for controlling said input means, said first and second text memory means, said translation dictionary means, said translation processing means, and said display means, and for performing edit processing of at least the translated text displayed on said display means in accordance with the edit information from said input means, said control edit means comprising:

changing means for changing one of the second language words included in the translated second language text to another second language word, and replacing means for replacing at least one second language word included in the translated second language idiom, as well as each of the second language words in the translated second language text and which are identical to the second language word changed to said another second language word, with said another second language word.

2. A system according to claim 1, wherein said changing means include translated word selecting means for selecting one of the second language words from said word/idiom dictionary means which corresponds to the second language word to be changed by said changing means.

3. A system according to claim 1, wherein said changing means includes translated word correcting means for correcting one of the second language words included in the translated text to a second language word arbitrarily input by said input means.

4. A system according to claim 1, wherein said replacing means includes means for, when the second language word is changed to said another second language word by said changing means, causing said display means top display the another second language word and the entry word corresponding thereto.

5. A system according to claim 1, wherein said display means displays the translated text and the original text so that they correspond to each other in display position.

6. A system according to claim 1, wherein said control edit means includes means for, when said changing means changes one of the second language word of the translated text to another second language word, forming a pair of the changed second language word and the first language word corresponding to the changed second language word.

7. A system according to claim 1, wherein said control edit means includes table means having a first table wherein a plurality of first language words and idiom entries are numbered by a plurality of entry numbers, and a second table wherein each of words included in at least two entries corresponds to some of the entry numbers.

8. A dictionary maintenance method used in a machine translation system comprising input means for inputting at least character information and edit information for an edit operation, first text memory means for storing an original text presented in a first language and including a plurality of first language words and at least one first language idiom to be translated into a second language, translation dictionary means for storing information for performing a translation, and including word/idiom dictionary means, for storing a plurality of first language words and at least one first language idiom which are used as entry words and idiom, in correspondence with a plurality of second language words represented in a second language, translation processing means for translating the original text stored in said first ext memory means into the second language by use of said translation dictionary means, to obtain a second language translated text including a plurality of second language words and at least one second language idiom, second text memory means for storing the translated text obtained by said translation processing means, display means for displaying the original text stored in said first text memory means and the translated text stored in said second text memory means, and control edit means for controlling said input means, said first and second text memory means, said translation dictionary means, said translation processing means, and said display means, and for performing edit processing of at lest the translated text displayed on said display means in accordance with the edit information from said input means, said method comprising:

a first step of causing said control edit means to change one of the second language words in the translated text to another second language word, and a second step of replacing at least one second language word included in the translated second language idiom, as well as each of the second language words in the translated second language text and which are identical to the second language word changed to said another second language word, with said another language word.

9. A method according to claim 8, wherein the first step includes a step of selecting one of the second language words from said word/idiom dictionary means which corresponds to the second language word to be changed by said changing means.

10. A method according to claim 8, wherein first step includes a step of correcting one of the second language words included in the translated text to a second language word arbitrarily input by said input means.

11. A method according to claim 8, wherein the priority changing step includes the step of providing priority to a translated word in which the translated word portion corresponding to the designated word in the original text is replaced with said another translated word for all the translated words corresponding to the entry words including the designated word in said word/idiom dictionary means.

12. A method according to claim 8, wherein the priority changing step includes the step of providing priority to a translated word in which the translated word portion corresponding to the designated word in the original text is replaced with said another translated word for translated words corresponding to some of the entry words including the designated word in said word/idiom dictionary means.

13. A method according to claim 12, wherein the priority changing step further includes the step of designating, through said input means, the entry word, which provides priority to the translated word in which the translated word portion corresponding to the designated word in the original text is replaced with said another translated word, of the entry words including the designated word in said word/idiom dictionary means.

14. A method according to claim 8, wherein the priority changing step includes a step of, when the second language word is changed to another second language word by said changing means, causing said display means to display the another second language word and the entry word corresponding thereto.

15. A method according to claim 12, wherein the priority changing step includes the step of providing priority to a translated word in which the translated word portion corresponding to the designated word in the original text is replaced with said another translated word for only entry words satisfying a designated condition of the entry words including the designated word in said word/idiom dictionary means.

16. A method according to claim 15, wherein the priority changing step further includes the step of designating a condition of an entry word, which provides priority to the translated word in which the translated word portion corresponding to the designated word in the original text is replaced with said another translated word, of the entry words including the designated word in said word/idiom dictionary means.

17. A method according to claim 8, wherein the priority changing step includes the step of, when there is no translated word in which the translated word portion corresponding to the designated word in the original text is replaced with said another translated word in translated words corresponding to the entry words including the designated word in said word/idiom dictionary means, generating a translated word in which the translated word portion corresponding to the designated word in the original text is replaced with said another translated word and registering the generated translated word in said word/idiom dictionary means.

18. A method according to claim 8, which includes a step of displaying the translated text and the original text so that whey correspond to each other in display position.

19. A method according to claim 8, which includes a forming step for, when said changing means changes one of the second language words of the translated text to anther second language word, forming a pair of the changed second language word and the first language word corresponding to the changed second language word.

* * * * *